United States Patent
Hughes et al.

(10) Patent No.: US 10,677,395 B2
(45) Date of Patent: Jun. 9, 2020

(54) SENSOR

(71) Applicant: Palliser Industries, Inc., Edmonton (CA)

(72) Inventors: Len P. Hughes, Edmonton (CA); Alejandro J. Juan, Calgary (CA)

(73) Assignee: Palliser Industries, Inc., Edmonton (CA)

( * ) Notice: Subject to any disclaimer, the term of this patent is extended or adjusted under 35 U.S.C. 154(b) by 36 days.

(21) Appl. No.: 16/098,402

(22) PCT Filed: May 3, 2017

(86) PCT No.: PCT/US2017/030838
§ 371 (c)(1),
(2) Date: Nov. 1, 2018

(87) PCT Pub. No.: WO2017/192721
PCT Pub. Date: Nov. 9, 2017

(65) Prior Publication Data
US 2019/0093830 A1    Mar. 28, 2019

Related U.S. Application Data

(60) Provisional application No. 62/331,269, filed on May 3, 2016.

(51) Int. Cl.
*G01N 27/04* (2006.01)
*F17D 5/06* (2006.01)
*G01M 3/18* (2006.01)

(52) U.S. Cl.
CPC ............ *F17D 5/06* (2013.01); *G01M 3/186* (2013.01); *G01N 27/041* (2013.01)

(58) Field of Classification Search
CPC ......... F17D 5/06; G01M 3/186; G01N 27/041
See application file for complete search history.

(56) References Cited

U.S. PATENT DOCUMENTS

| | | | |
|---|---|---|---|
| 2007/0163892 A1* | 7/2007 | Haridas | G01N 17/04 205/776.5 |
| 2009/0068060 A1* | 3/2009 | Alfermann | G01N 17/04 422/53 |
| 2012/0007617 A1* | 1/2012 | Fisseler | G01N 17/02 324/700 |

* cited by examiner

*Primary Examiner* — Jermele M Hollington
*Assistant Examiner* — Alvaro E Fortich
(74) *Attorney, Agent, or Firm* — Bushman Werner, P.C.

(57) ABSTRACT

A sensor assembly for detecting material loss of a vessel transporting flowing media, the sensor assembly having at least one sensor positioned between a pair of annular plates such that the radially innermost surface of the sensor is in open communication with the flowing media. A series of parallel resistors spaced along the sensor and transmit a signal. As the material of the annular plates is worn away by corrosion and/or erosion, the outermost resistor becomes exposed to the flowing media and breaks the circuit as to that resistor, thus changing the signal.

13 Claims, 3 Drawing Sheets

SENSOR

CROSS REFERENCE TO RELATED APPLICATION

This application claims priority to U.S. application Ser. No. 62/331,269 filed on May 3, 2016, the disclosure of which is incorporated herein by reference for all purposes.

FIELD OF THE INVENTION

The present invention relates to sensors, in particular, erosion/corrosion sensors for use in lined pipes and polymer pipes.

BACKGROUND OF THE INVENTION

It is well known that in pipes and other vessels used to transport media, loss of the piping material occurs over time. Typically, such material loss is due to erosion and/or corrosion by the media being transported. The material loss is typically in the lower portion of the pipe and at points where media flow changes direction, e.g., bends or elbows within piping systems. Material loss can also be found at points where flow characteristics change, as at piping joints. When transporting corrosive media, material loss can occur in any location. The flow of the media gradually eats away at the inner surface of the pipe, resulting in material loss and weakening of the pipe. The rate and location of material loss are impacted by the material of the pipe liner and/or the pipe, the temperature of the media, the velocity of the media, media particulate and the chemical makeup of the media.

In the mining, oil and gas industries, internal corrosion of the pipe is often caused by carbon dioxide, water, hydrogen sulfide, chlorides, bacteria, completion fluids, and other substances found in the produced hydrocarbon. Pipe erosion can be caused by high velocities of the fluids and multiphase fluid systems, e.g., slurries and tailings.

Typically, to identify material loss of a pipe due to erosion/corrosion, a visual inspection and/or cameras and/or probes are performed. This requires the media transportation to be interrupted to visually inspect the inside of the pipe. Other technology used to identify material loss in a pipe includes ultrasonic technology and radiography or x-ray. These techniques are used from the outside of the pipe.

SUMMARY OF THE INVENTION

In one aspect, the present invention provides a sensor for detecting material loss in a pipe or other vessel.

In another aspect, the present invention provides a system and method for continuously monitoring the material loss in a pipe or other vessel.

In still another aspect, the present invention provides an in situ system for continuously monitoring the material loss in a pipe or other vessel.

These and further features and advantages of the present invention will become apparent from the following detailed description, wherein reference is made to the figures in the accompanying drawings.

DETAILED DESCRIPTION OF PREFERRED EMBODIMENTS

The material loss sensor of the present invention detects material loss in pipe, valves, fittings, or pumps, hereafter collectively referred to as vessels. In the case of pipelines, the vessel material and thickness varies depending on the media being transported in the pipe, the terrain, the pressure of the media, etc. For low pressure activities, the vessel may be comprised of polyvinyl chloride (PVC), fiberglass, polypropylene, urethane or other such polymeric materials. For most oil and gas activities though the vessel material will be steel, either unlined or lined. Vessels can be lined with fiberglass, clay, urethane, polypropylene, or other polymers. In a preferred embodiment, the vessel is polymer lined steel pipe.

As used herein the terms "corrosion," "corrode," or the like refer to a wearing down of a material through a chemical reaction. As used herein the terms "erosion," "erode," or the like refer to a wearing down of a material through natural forces, i.e., the flowing of fluid over a stationary surface. It will be understood that erosion and corrosion can occur simultaneously and the use of one of the terms does not mean the other is not also occurring. As used herein, unless otherwise specified, the terms "pipe," "pipeline," and the like refer to lined or unlined pipe.

Figure 1:
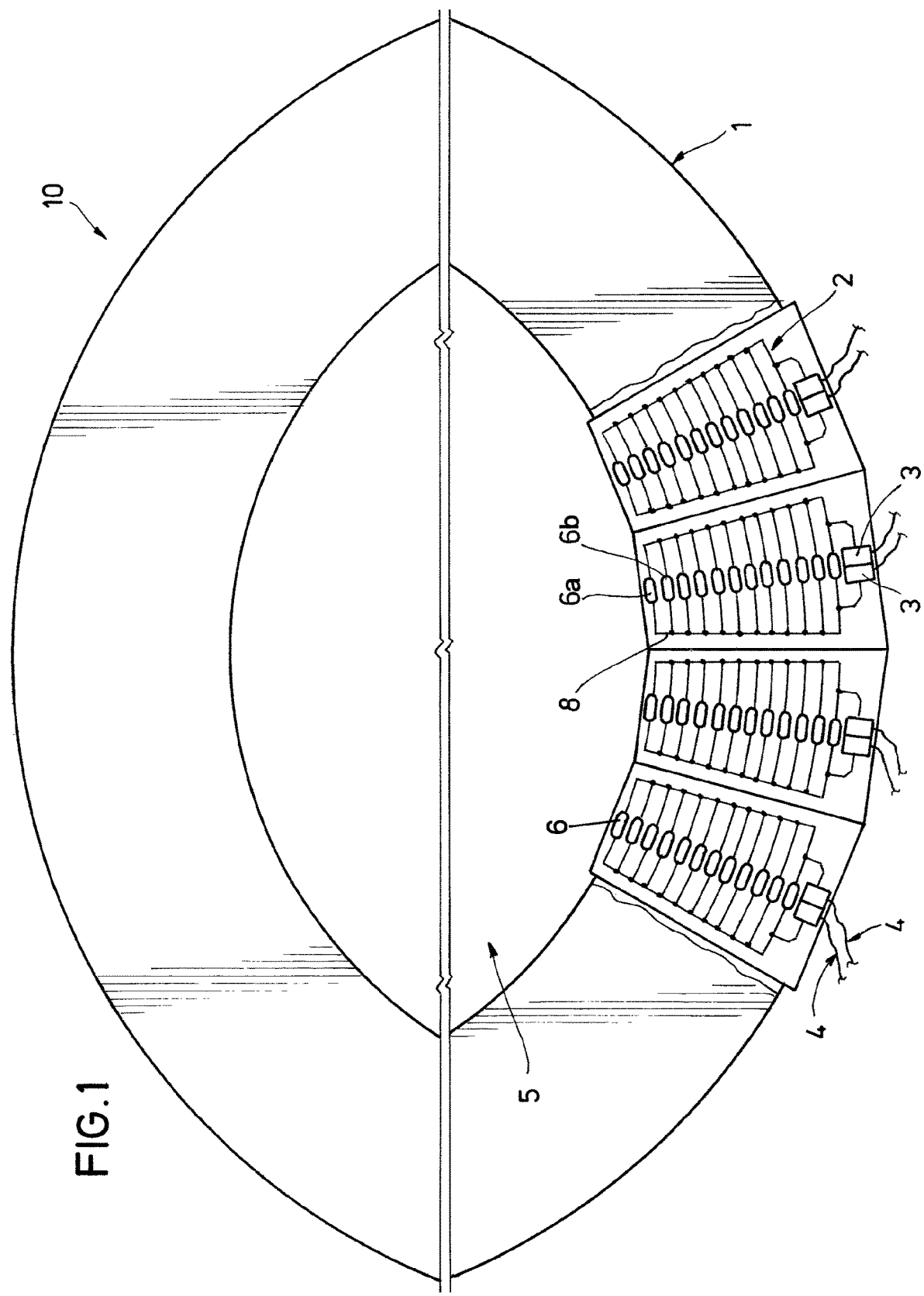
FIG. 1 illustrates one embodiment of the sensor plate of the present invention.
Figure 2:
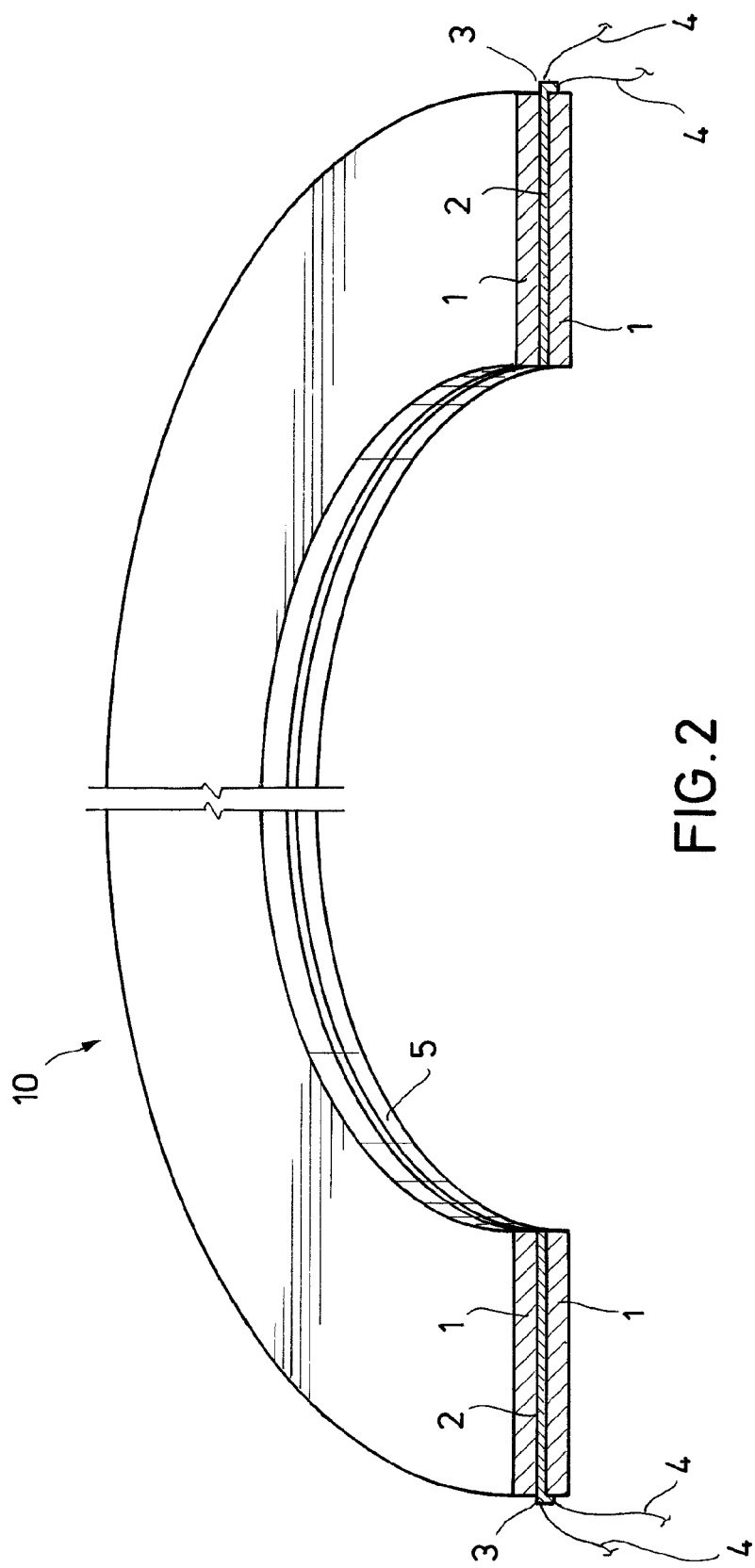
FIG. 2 is an isometric view of the sensor plate shown in FIG. 1

Turning to FIGS. 1 and 2, the material loss sensor assembly, shown generally as 10, comprises plurality of substrates or plates 1 positioned on either side of at least one, preferably a plurality of, sensors 2. The plates 1 are annular, forming a central bore 5. Each of sensors 2 has at least one attachment point 3 for hard wire 4. In a preferred embodiment, attachment point 3 extends slightly beyond the radially outermost surface of plates 1. The hard wires 4 extending from the sensors 2 transmit signals indicating integrity of the vessel. In a preferred embodiment, the plates 1 are made of material having similar erosion and/or corrosion characteristics as the vessel. In a most preferred embodiment, the vessel and the plates 1 are made of compatible materials. Compatible materials, as the term is used herein with respect to the vessel and the plates, are materials in which the sensors and plates of the present invention can be bonded/ embedded in the pipe without the sensors being simply washed away by the flowing media. In a non-limiting example, the plates 1 are formed of rubber and are bonded to one another by heat or glue. In a preferred embodiment, the plates 1 are at least semi-rigid. This rigidity can be accomplished by using a semi-rigid material for the plate 1, e.g., a rigid plastic plate or substrate, or through the use of circumferentially spaced rigid materials positioned throughout the plate 1, e.g., a rubber plate with spaced plastic spokes. FIGS. 1 and 2 illustrate the assembly with a portion of one plate 1 removed. This is strictly for illustrative purposes to show the arrangement of sensors 2. It will be appreciated that plates 1 cover the entire faces of sensors 2. In a preferred embodiment, sensors 2 are positioned circumferentially around the entire sensor assembly 10. In alternative embodiments, the sensors 2 may be positioned only at the lowermost partition, or at particular points in which material loss is anticipated. In any event, the radially innermost surface of sensors 2 should be in open communication with the flow path of the media being transported.

The sensors 2 transmit a value or signal to a receiver (not shown). The electrical signal strength from the sensors indicates vessel integrity. Each sensor 2 has a plurality of parallel resistors 6 and conductive legs 8 forming a ladder configuration. The loss of vessel and/or plate material, whether due to erosion or corrosion, exposes the radially innermost resistor 6 of at least one sensor 2 to the media flowing through the vessel. This exposure breaks the circuit of the exposed resistor and changes the signal. The next resistor 6 in the ladder remains intact until further material loss exposes it and breaks the resistor, further changing the signal. The sensor of the present invention thus provides continuous nonintrusive monitoring of vessel material loss at predetermined points within the vessel. By monitoring the incremental change of signal due to the incremental breaking of resistors 6, the amount and location of and material loss of the vessel can be determined.

For example, and with reference to FIG. 1, as the radially inner surface of plate 1 is worn down through erosion/corrosion, resistor 6a will eventually be exposed to the media flowing through open area 5. Because of the parallel resistor configuration, the exposure of resistor 6a will not break the circuit completely, but rather only with respect to resistor 6a itself. Thus the signal from the circuit of sensor 2 will change, but not stop completely. The changed signal will continue until further erosion/corrosion by the flowing media exposes and breaks resistor 6b, at which point the signal will change again. Thus, the amount and location of the loss of material along the inner surface of the pipe can be determined.

The resistors can be affixed to the sensors by means well known to those skilled in the art, including but not limited to via printed circuit boards, laser cut circuit boards, welding, soldering, etc.

It will be appreciated that the number of resistors on each sensor and their distance from each other can vary depending on the circumstances. Accordingly, the present invention may be used with only a single resistor such that when the resistor is broken, the signal terminates and the user knows it is time for repair/replacement of the vessel material.

The sensor assembly 10 of the present invention can be integrated within the vessel during manufacture at various points utilizing various sensor assemblies within the vessel. For example, the sensor assembly 10 can be positioned within vessel to be lined, such that the assembly is embedded within the lining. Alternatively, the sensory assembly 10 can be positioned between two surfaces of the vessel during assembly. For example, the sensor assembly 10 could be positioned between two flange faces of two pieces of pipe. When positioned between the two flange pieces, it is not necessary that the material of the vessel be compatible with the material of the plates 1 because the plates will not be embedded or integrated with the vessel.

Figure 3:
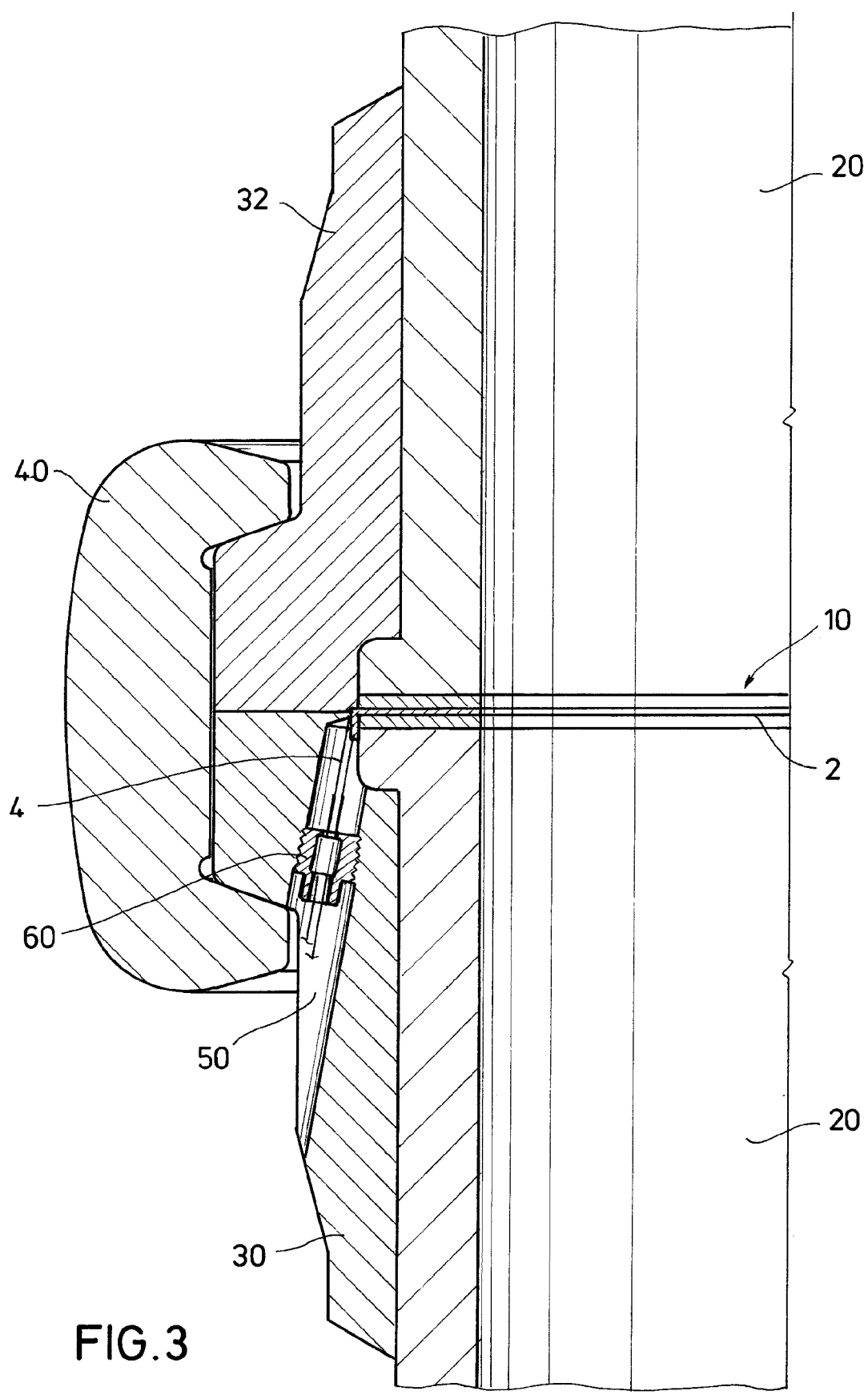
FIG. 3 is an elevational cross-section view of the sensor assembly of the present invention positioned within a vessel.

Turning to FIG. 3 there is shown the seal assembly 10 of the present invention positioned between two pieces of pipe 20. The pieces of pipe 20 are coupled together by way of hubs 30 and 32, held together by clamp 40. Within hub 30 is shown an access port or conduit 50. Hard wires 4 from a sensor 2 extend through access port 50, and into plug 60. Access port 50 thus allows access to sensor assembly 10 for connecting it to an external receiver/data reader (not shown). In a preferred embodiment, hub 30 has multiple access ports 40 circumferentially spaced around it. It will be further appreciated that FIG. 3 shows an example of accessing sensor assembly 10 wherein a particular pipe coupler is employed. There are numerous ways of connecting pipe using couplers, clamps, rings, flanges, etc. Similar access ports can be employed in the various types of couplers, clamps, rings, flanges, etc. Alternatively, similar access ports could be positioned in the pipe wall itself. The invention is not limited to the singular embodiment illustrated herein.

The invention has generally been described herein as being used in connection with mining, oil and gas pipelines. It is to be understood that the invention is not so limited and can be used in a variety of environments in which there is a need to detect the loss of material due to flowing media/fluid.

The present invention provides advantages over the prior art methods of detecting material loss. The present invention allows for non-intrusive in situ continuous monitoring of the material loss rather than periodic intrusive maintenance inspections. With continuous monitoring, the rate of loss of material can be calculated and repair/replacement work scheduled more efficiently. Further, the material loss can be detected without the need to interrupt the transportation process for an internal inspection of the pipe.

Although specific embodiments of the invention have been described herein in some detail, this has been done solely for the purposes of explaining the various aspects of the invention, and is not intended to limit the scope of the invention as defined in the claims which follow. Those skilled in the art will understand that the embodiment shown and described is exemplary, and various other substitutions, alterations and modifications, including but not limited to those design alternatives specifically discussed herein, may be made in the practice of the invention without departing from its scope.

What is claimed is:

1. A sensor assembly for detecting material loss of a vessel transporting flowing media comprising:
   at least one sensor positioned between a plurality of annular plates;
   said at least one sensor having a radially innermost edge, a radially outermost edge, and a plurality of parallel resistors spaced along said sensor;
   at least one wire attached to the radially outermost edge of said sensor;
   said sensor operative to transmit a signal, said signal changing when said flowing media breaks at least one of said resistors.

2. The assembly of claim 1, comprising a plurality of said sensors.

3. The assembly of claim 1, wherein said vessel comprises a pipe, valves, fittings, or pumps.

4. The assembly of claim 1, wherein said vessel comprises a polymer lined pipe.

5. The assembly of claim 1, wherein said plurality of annular plates are made from material compatible with said vessel.

6. A method of detecting material loss of a pipe within a pipeline transporting flowing media, comprising:
   providing a sensor assembly for detecting material loss, said assembly comprising:
   at least one sensor positioned between a plurality of annular plates;
   said at least one sensor having a radially innermost edge, a radially outermost edge, and a plurality of parallel resistors spaced along said sensor;
   at least one wire attached to the radially outermost edge of said sensor;
   said sensor operative to transmit a signal, said signal changing when said flowing media breaks at least one of said resistors;

positioning said sensor assembly within said pipeline such that the radially innermost edge of said at least one sensor is in open communication with said flowing media;

monitoring said signal transmitted from said sensor.

7. The method of claim 6, comprising a plurality of said sensors.

8. The method of claim 6, wherein said plurality of annular plates are made of a material compatible with said pipe.

9. The method of claim 6, wherein said pipe is lined and said sensor assembly is embedded in said lining of said pipe.

10. The method of claim 6, wherein said pipe has a sealed access port through which said at least one wire extends.

11. The method of claim 6, wherein said sensor assembly is positioned between the faces of two pipes in said pipeline.

12. The method of claim 11, wherein said sensor assembly is held in place by a coupler.

13. The method of claim 12, wherein said coupler has an opening therethrough, said wire of said sensor extending through said opening in said coupler.

\* \* \* \* \*